Aug. 1, 1950 M. C. LUTERICK 2,516,895
ICE CREAM SOFTENER
Filed Aug. 30, 1949 2 Sheets-Sheet 1

MARCELLUS C. LUTERICK,
INVENTOR.

BY
ATTORNEY

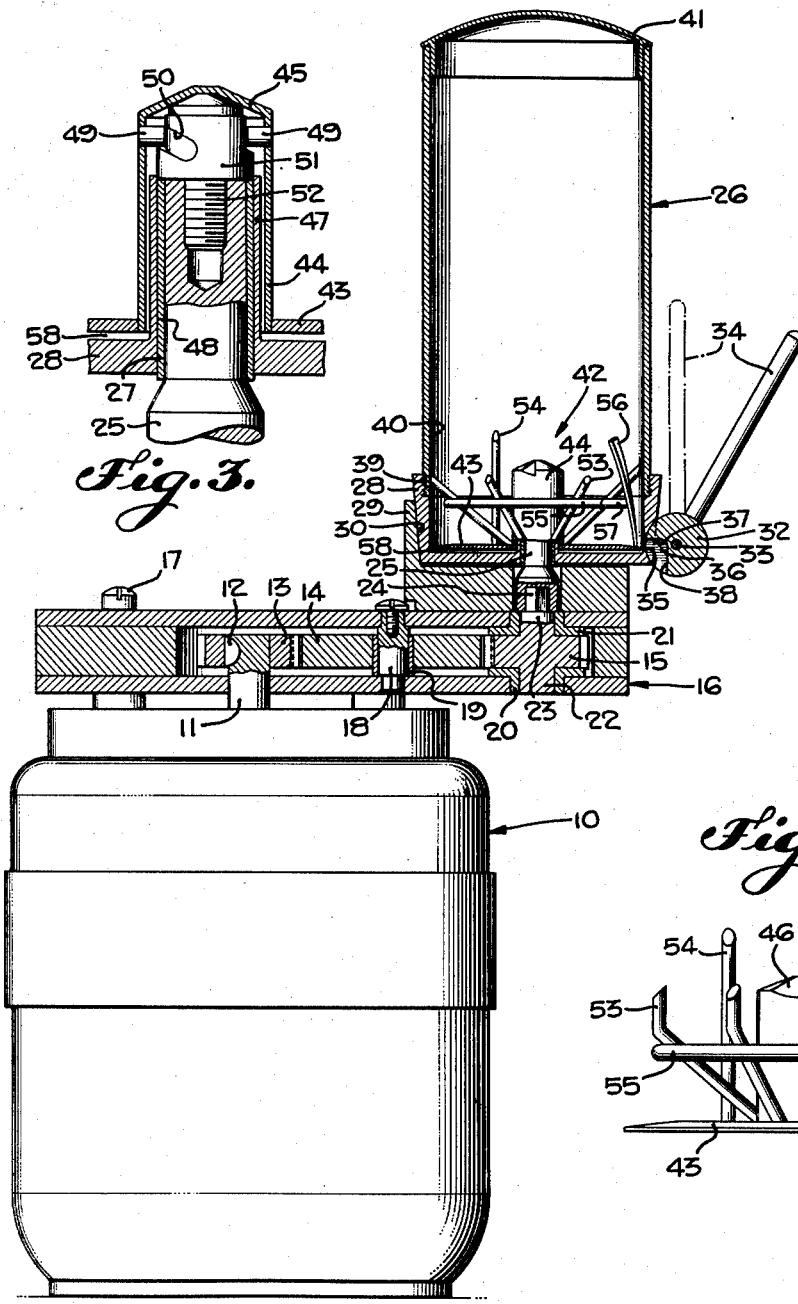

Patented Aug. 1, 1950

2,516,895

UNITED STATES PATENT OFFICE 2,516,895

ICE CREAM SOFTENER

Marcellus C. Luterick, Montrose, Calif., assignor, by mesne assignments, to Diced Cream of America Co., Los Angeles, Calif., a corporation of Delaware Application August 30, 1949, Serial No. 113,054

3 Claims. (Cl. 259—109)

This invention relates to the treatment of ice cream and particularly pertains to an ice cream softener.

Heretofore it has been common practice to place one or more scoops of ice cream in a cone. The ice cream of course is hard and is scooped out of a bulk container by means of a scoop or dipper. This has not proved to be satisfactory due to the hardness of the ice cream and the crispness of the cones. More recently ice cream making machines have been designed which make ice cream having a semi-solid consistency so that the ice cream is fluid in character. In such ice cream making machines the semi-solid ice cream is caused to flow outwardly through the central discharge tube and into an ice cream cone. This fluid ice cream flows into a cone and completely fills it and is of such a consistency that the semi-solid ice cream may pile up on top of the cone. The ice cream manufacturing devices required for this purpose are however large and cumbersome, and are comparatively expensive. It also is necessary to make the ice cream in large batches. It is desirable therefore to provide means for reducing scoopfuls of solid ice cream, or cubes of a commercial product known as "Diced Cream," into a semi-solid state so that it may be mixed immediately and discharged into a cone or placed on dessert, such as pie.

In the general type of mixer which has been made heretofore for producing soft ice cream the mass of ice cream has often frozen within the bottom of the mixer so that the mixing element has had difficulty in moving and in many instances the driving motor has been stalled. It is the principal object of the present invention, therefore, to provide a relatively small and inexpensive ice cream softener which may be used at soda fountains and the like, and into which relatively small quantities of ice cream and flavoring may be placed as desired and reduced to a semi-fluid state without possibility of freezing a mass of ice cream in the mixing container or stalling the mixing motor.

In ice cream softening machines as now used the construction is such that the ice cream may be contaminated and it is very difficult to clean and sterilize the parts and container so that bacteria will not accumulate and grow on the parts. It is another object of the present invention therefore to provide a structure which may be readily sterilized and in which the parts may be easily assembled or taken apart when desired without possibility of liquid or fluid flowing into contact with unsterile surfaces.

The present invention contemplates the provision of a base carrying a driving motor and upon which base is mounted an ice cream receptacle and mixer within which ice cream and flavoring may be placed and from the bottom of which the ice cream and mixed flavoring may be discharged in a semi-solid or fluid state.

The invention is illustrated by way of example in the accompanying drawing in which:

Fig. 2 is a view in central vertical section as seen on the line 2—2 of Fig. 1 showing the driving mechanism and indicating the relationship of the shipping structure to the ice cream container.

Fig. 3 is an enlarged detail showing the mounting structure for the whipper.

Fig. 7 is a view in elevation showing another form of whipping element with a different arrangement of tines.

Figure 1:
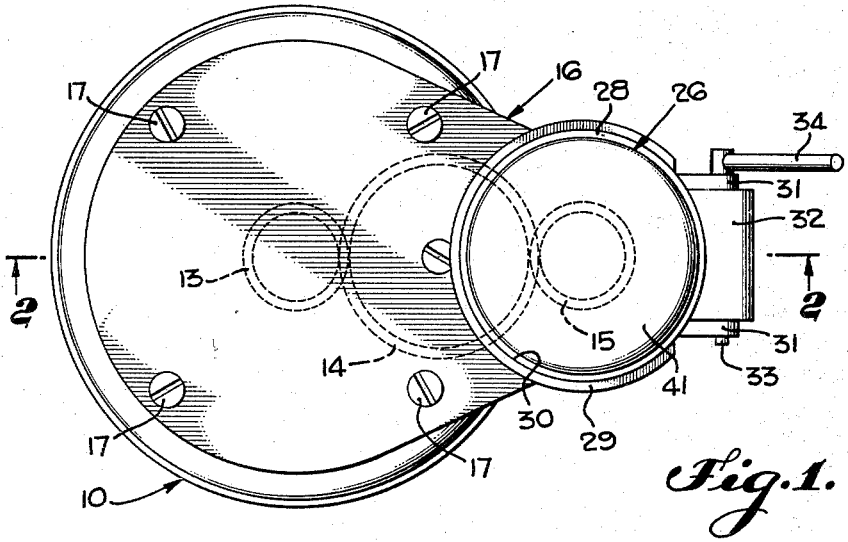
Figure 1 is a view in plan showing the complete ice cream softener with which the present invention is concerned.

Referring more particularly to the drawings, 10 indicates the base of the structure which is here shown as enclosing a driving motor having a vertically disposed armature. The armature is indicated at 11 and extends upwardly through the case of the motor to be keyed at 12 to a driving pinion 13. The pinion 13 is in mesh with an intermediate gear 14 and a driven pinion 15. The pinions and gears are enclosed within a gear case 16 which extends horizontally and is secured to the motor case by screws 17. The gear 14 is mounted upon a shaft 18 and carries a bushing 19 allowing the shaft to freely rotate. The driven pinion 15 is mounted in suitable bushings 20 and 21. The pinion 15 is provided with a lower cylindrical extension 22 fitting in bushing 20 and an upper cylindrical extension 23 extending through the bushing 21. A reduced pin portion 24 is mounted upon the extension 23 and carries a driving pin 25 which is threaded to the extension and projects upwardly into an ice cream container 26. A bushing 27 is pressed over the driving pin 25 and extends through the base cup 28 forming a part of the container. The cup 28 is free and may be moved when desired. It is designed to set within the seat member 29 which has a tapered face 30 in the form of a partial circle. The seat 29 is of a shape so that it will be semi-circular and will support the cup 28 so that it overhangs the outer edge of the gear case 16. Mounted upon the cup 28 is a pair of parallel lugs 31 which receive an oscillating cylindrical valve 32. This valve is carried by pivot pins 33 which extend through the lugs 31 and allow the valve to have partial rotation as manipulated by a handle 34 secured upon one of the pivot pins 33 and which handle may move from the solid line position indicated in Fig. 2 to the dotted line position indicated in the same figure. An outlet opening 35 is formed through the forward wall of the cup 28 at the lower edge thereof, and a valve outlet passageway 36 may be moved to register with this opening when desired. Attention is directed to the fact that the wall of this passageway is angular and when opened it has a horizontal portion 37 in register with the upper edge of the opening 35 and a vertical portion 38 which provides a downwardly presented spout through which the soft ice cream may flow.

The cup 28 is internally threaded at its upper end, as indicated at 39, and will receive a cylindrical wall 40 of the ice cream container 26. The upper end of the container may be closed by a removable cap 41 which normally telescopes into the cylindrical wall 40 and has a flange resting upon the upper edge thereof. When the cap 41 is removed ice cream may be placed in the receptacle 26. It is preferable that this is placed in the receptacle in measured quantities such as the accurately measured quantity within a package of ice cream commercially known as "Diced Cream." The ice cream when placed within the receptacle 26 is usually in a hard and frozen condition.

In usual practice various types of beaters have been provided to stir and move the ice cream at the bottom of the container. It has been found, however, that most types of beaters in use move the ice cream against the walls of the container so that the mass of semi-fluid material tends to freeze and will make it difficult to drive the beater. In fact in some instances the frozen mass will retard the beater to such an extent as to stall the motor. In the present invention it has been found that a whipping action is desirable, and that in the event the ice cream tends to form a mass it will be held around the rotating axis of the structure and will not be wedged into intimate contact with the wall 40 of the container so that it might freeze. It has also been found that by performing a beating or whipping action with members which are relatively small in cross-section and are somewhat tine-like that the ice cream may be more easily softened, and that furthermore by arranging the tines at different angles to each other and of different lengths there is a tendency to more efficiently disintegrate and soften the ice cream without the possibility of it forming a frozen mass. In meeting this problem it has been found that there is a tendency for the fluid ice cream to flow through the joints occurring between the various parts and to reach parts of the apparatus which might not be sterile. In view of the fact that bacteria in ice cream and milk multiply rapidly it is desirable to prevent this action and also to form the parts so that they may be easily removed for cleaning and sterilization. In order to accomplish this purpose the whipping structure generally indicated at 42 is formed with a highly polished disc 43 which fits within the bottom of the cup 28. This disc has a central opening fitting around a sleeve 44, which sleeve extends upwardly and is closed with an end cap 45. The sleeve is substantially conical in shape and is provided with spiral indentations 46 which tend to disintegrate the mass of ice cream. The sleeve 44 is of a diameter to fit over a tubular trap 47. This trap is formed integral with the bottom wall of the cup 28 and extends around the central opening 48 thereof. The height of the sleeve has been determined as being at a higher level than the accumulated liquid within the container 26 so that there will be no opportunity for liquid ice cream or milk to flow upwardly within the sleeve 44 and over the upper edge of the trap 47 into contact with the driving mechanism below the cup. The sleeve 44 is locked in position by pins 49 which extend inwardly and may lock within spiral grooves 50 carried by the head 51 of a lock pin 52 which is threaded into the upper end of the member 25.

Figure 4:
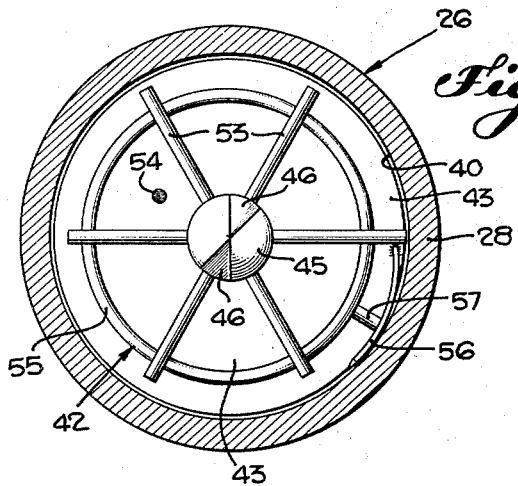
Fig. 4 is a view in plan showing the whipping structure as disassociated from some of the other parts of the device.
Figure 5:
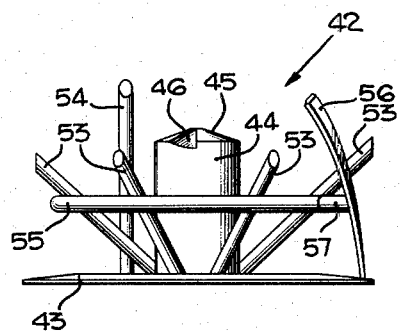
Fig. 5 is a view in elevation showing the whipping structure, the tines, and their supporting members together with the scraper.
Figure 6:
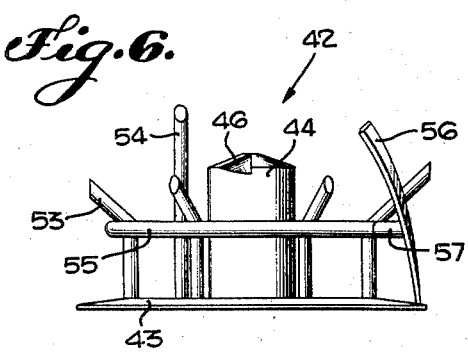
Fig. 6 is a view in elevation showing a modified form of the whipping elements and the tine arrangement.

With particular reference to Figs. 4 and 5 it will be seen that the sleeve 44 and the disc 43 carry radial tines 53 and a vertical tine 54. The radial tines emanate from the disc 43 adjacent to the base of the sleeve 44 and extend outwardly toward the inner circumference of the container wall 40. These tines vary in length and have inclined end faces which are in planes substantially parallel to the circumferential vertical plane of the container wall 40. The tines are held in position by an annular ring 55 which is spaced a distance above the disc 43 and is of a diameter less than the inside diameter of the wall 40. The ring and the tines therefore form a basket-like structure which will support the mass of ice cream away from the wall 40 as well as prevent it from resting upon the disc 43. As the ice cream is whipped and softened it will flow downwardly onto the disc 43 and when the valve 32 is opened it may be discharged from the container. In the meantime there is probability that the ice cream will be packed around the beater or whipping mechanism and will resist the driving action of the motor. In order to insure that any ice cream which has accumulated on the interior face of the wall 40 is removed, a scraper 56 is provided. This scraper is fastened to the disc 43 near its marginal edge and extends upwardly and over the disc to conform substantially to the wall 40. The scraper is braced in position by a member 57 which is secured to the ring 55.

In operation of the present invention the cup 28, the seat 29, the whipper 42, and the container 26 are thoroughly sterilized. These parts are then carefully assembled, as shown in Fig. 2 of the drawing, by first mounting the seat 29 upon the gear structure 16 and with the driving pin 25 extending upwardly through the opening 16'. The whipper 42 is then placed in position by mounting the sleeve 44 over the driving pin 25 and with the sleeve locked in position on the end of the pin by the pin and slot connection. When this is done the sleeve 44 will telescope over the trap tube 47, and the disc 43 will rest flat against the bottom face of the seat 29. Attention is directed to the fact that the bottom face of the disc is highly polished, and it is supported to form a relatively small space between the disc and the floor of the seat. This allows a thin film of fluid ice cream to flow into the space indicated at 58, which film of fluid ice cream can only rise to the top of the trap tube 47. In view of the fact that the fluid level within the container never reaches this height there is no possibility for the fluid ice cream to flow down along the driving pin 25 and to become contaminated by the driving gears. It is also to be pointed out that the tines 53 and the ring 55 will act in effect to form a basket into which the broken chunks of ice cream may be supported in a manner to prevent the ice cream from moving outwardly and becoming packed against the side wall 40 of the container. The various tines 53 which are disposed in angular relation to the disc 43 and the tine 54 engage the pieces of ice cream and gradually reduce them in size and whip the ice cream so that it assumes the character of a confection known as parfait. In this type of ice cream the ice cream is semi-solid and will flow outwardly through the opening 35 when the valve 32 is open, as shown in solid lines in Fig. 2 of the drawing. The centrifugal action created by the whipper 42 will tend to move the semi-solid material outwardly and allow it to drain through the opening 35. The scraper blade 56 will act at this time to scrape the surface of the wall 40 and gradually move any accumulated material downwardly along the wall 40 and the wall of the cup 28.

If desired, portions of fresh fruit or measured amounts of flavoring material may be placed in the container 26 before the switch of the motor is turned on. This causes a soft ice cream to be made which is approximately flavored and requires a measured quantity of ice cream which is only necessary for one serving when either discharged into an ice cream cone, on a dish, or onto pie or cake, or the like.

The fact is to be emphasized that the device here used does not act to cut the ice cream into small particles but in effect whips the ice cream so that a whipped product is produced which is believed to be superior to products made by cutting blades.

It will thus be seen that the base and driving structure are compact, that the various parts of the container, valve mechanism, and whipping device may be easily disassembled and sterilized, and may be easily placed together again so that the apparatus can be used for treating a soft ice cream mixture of one flavor or may be used in treating an ice cream mixture of some other flavor.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A whipping device for use within a container of an ice cream mixing or softening machine, comprising a circular disc designed to be mounted within the bottom of the container and substantially of a diameter equal thereto, a plurality of inclined radially extending tines emanating from said disc with their ends terminating adjacent the wall of the container, a ring embracing said tines and being of a diameter less than the diameter of the container whereby the tines and the ring will form a basket structure whereby relatively hard pieces of ice cream may be broken into smaller particles and retained in said basket-like structure while being reduced to a fluid state and while being held out of intimate contact with the container.

2. In a device of the character described, a container within which ice cream is placed, a whipping device within the container for reducing the ice cream to a fluid consistency, a driving pin extending upwardly through the bottom of the container, said whipping device adapted to be mounted over the driving pin and comprising a relatively flat disc supported over the floor of the container, said disc carrying a central closed sleeve fitting over the driving pin and interlocking therewith, a plurality of tines extending upwardly from the disc and acting to form a basket for the ice cream as well as reduce the ice cream to a semi-solid consistency, and a trap tube extending upwardly from the floor of the container and around the driving pin while being enclosed by the sleeve, the plane of the upper edge of the trap tube being higher than the normal plane of the accumulated liquid within the container.

3. The structure of claim 2 including a fluid outlet at the bottom of the container and a manually operated valve adapted to open and close the fluid outlet.

MARCELLUS C. LUTERICK.

REFERENCES CITED

The following references are of record in the file of this patent:

UNITED STATES PATENTS

| Number | Name | Date |
|---|---|---|
| 1,387,380 | Fryer | Aug. 9, 1921 |
| 1,560,826 | Kirshbraum | Nov. 10, 1925 |
| 1,682,200 | Straight | Aug. 28, 1928 |
| 1,727,410 | Poesse | Sept. 10, 1929 |
| 1,816,050 | Lee | July 28, 1931 |
| 1,919,541 | Davis | July 25, 1933 |
| 2,313,760 | McLean | Mar. 16, 1943 |